United States Patent [19]

Wu et al.

[11] Patent Number: 5,311,828
[45] Date of Patent: May 17, 1994

[54] INCINERATOR

[76] Inventors: I-Cheng Wu; Guor-Rern Wu, both of No. 147, Hou-Li Rd., Hou-Li Hsiang, Taichung Hsien, Taiwan

[21] Appl. No.: 53,905
[22] Filed: Apr. 26, 1993
[51] Int. Cl.$^5$ ............................................. F23G 5/12
[52] U.S. Cl. .................................. 110/248; 110/251; 110/254; 110/256
[58] Field of Search ............... 110/235, 251, 254, 256, 110/259, 242, 248

[56] References Cited

U.S. PATENT DOCUMENTS

| | | | |
|---|---|---|---|
| 2,715,881 | 8/1955 | O'Neil | 110/251 |
| 3,203,377 | 8/1965 | Claassen et al. | 110/251 |
| 3,241,504 | 3/1966 | Moores | 110/254 |
| 3,961,587 | 6/1976 | Ozawa | 110/254 |
| 4,109,590 | 8/1978 | Mansfield | 110/244 |
| 4,278,034 | 7/1981 | Roale | 110/251 |
| 5,245,936 | 9/1993 | Nakata | 110/251 |

Primary Examiner—Henry C. Yuen
Attorney, Agent, or Firm—Johnson & Gibbs

[57] ABSTRACT

An incinerator includes a furnace body which confines a combustion chamber for receiving refuse therein and which has a bottom wall formed with a central opening, an ash release gate mounted pivotally to the bottom wall at the central opening, a stack which is provided on one side of the furnace body and which has a lower end part that is communicated with the combustion chamber adjacent to the bottom wall, and an exhaust port provided adjacent to an open top of the furnace body and operable so as to communicate the stack and the combustion chamber. A furnace cover is provided on the open top of the furnace body. First and second preheating tube arrangements are received in the lower part of the furnace body. The first preheating tube arrangement includes a plurality of upwardly extending concentric coil turns and has a surface formed with a plurality of air holes. The second preheating tube arrangement has at least a portion provided adjacent to a lower end part of the first preheating tube arrangement and further has a surface formed with a plurality of air holes. A high pressure air generating unit supplies high pressure air to the first and second preheating tube arrangements and to an upper end part of the stack.

17 Claims, 6 Drawing Sheets

INCINERATOR

BACKGROUND OF THE INVENTION

1. Field of the Invention

The invention relates to an incinerator, more particularly to an improved incinerator which has a high refuse-burning efficiency and which generates less air pollution.

2. Description of the Related Art

As the population increases, the amount of refuse which is generated correspondingly increases. Presently, refuse is disposed by means of landfills or by incineration. Incineration is preferred over the use of landfills for disposing refuse since the latter requires a relatively large land area.

During incineration, the resultant flue gases are released to the atmosphere via a stack of the incinerator. The flue gases sometimes carry therewith ash particles that result from combustion of the refuse, thereby resulting in air pollution. Furthermore, the refuse usually has a relatively large water content, typically 30% by weight. As hot air rises from the bottom of the incinerator, water in the refuse moves downward, thereby resulting in the presence of thick smoke and unburned refuse. There is thus a need to execute secondary and even tertiary refuse treatments in order to minimize air pollution and to achieve a high refuse-burning efficiency. Such additional treatments are uneconomical since they require additional costs.

SUMMARY OF THE INVENTION

The main objective of the present invention is to provide an improved incinerator in which the flue gases that result from the combustion of refuse flow out of the incinerator from the bottom of the latter, thereby reducing the occurrence of secondary pollution.

Another objective of the present invention is to provide an improved incinerator which obviates the need for executing secondary and tertiary refuse treatments in order to minimize air pollution and in order to achieve a high refuse-burning efficiency.

Accordingly, the incinerator of the present invention comprises:

- a furnace body which confines a combustion chamber for receiving refuse therein, said furnace body having an open top, an inner surrounding wall surface, a lower part, an upper part, a bottom wall formed with a central opening, an ash release gate mounted pivotally to the bottom wall at the central opening, a stack which is provided on one side of the furnace body and which has an upper end part and a lower end part that is communicated with the combustion chamber adjacent to the bottom wall, and an exhaust port provided on the furnace body adjacent to the open top and operable so as to communicate the stack and the combustion chamber of the furnace body;
- a furnace cover provided on the open top of the furnace body;
- a first preheating tube arrangement secured to the inner surrounding wall surface of the furnace body at the lower part of the furnace body, said first preheating tube arrangement including a plurality of upwardly extending concentric coil turns and having a surface formed with a plurality of air holes;
- a second preheating tube arrangement secured to the lower part of the furnace body, said second preheating tube arrangement having at least a portion provided adjacent to a lower part of the first preheating tube arrangement and further having a surface formed with a plurality of air holes; and
- a high pressure air generating unit for supplying high pressure air to the first and second preheating tube arrangements and to the upper end part of the stack.

BRIEF DESCRIPTION OF THE DRAWINGS

Other features and advantages of the present invention will become apparent in the following detailed description of the preferred embodiments, with reference to the accompanying drawings, of which.

DETAILED DESCRIPTION OF THE PREFERRED EMBODIMENTS

Figure 1:
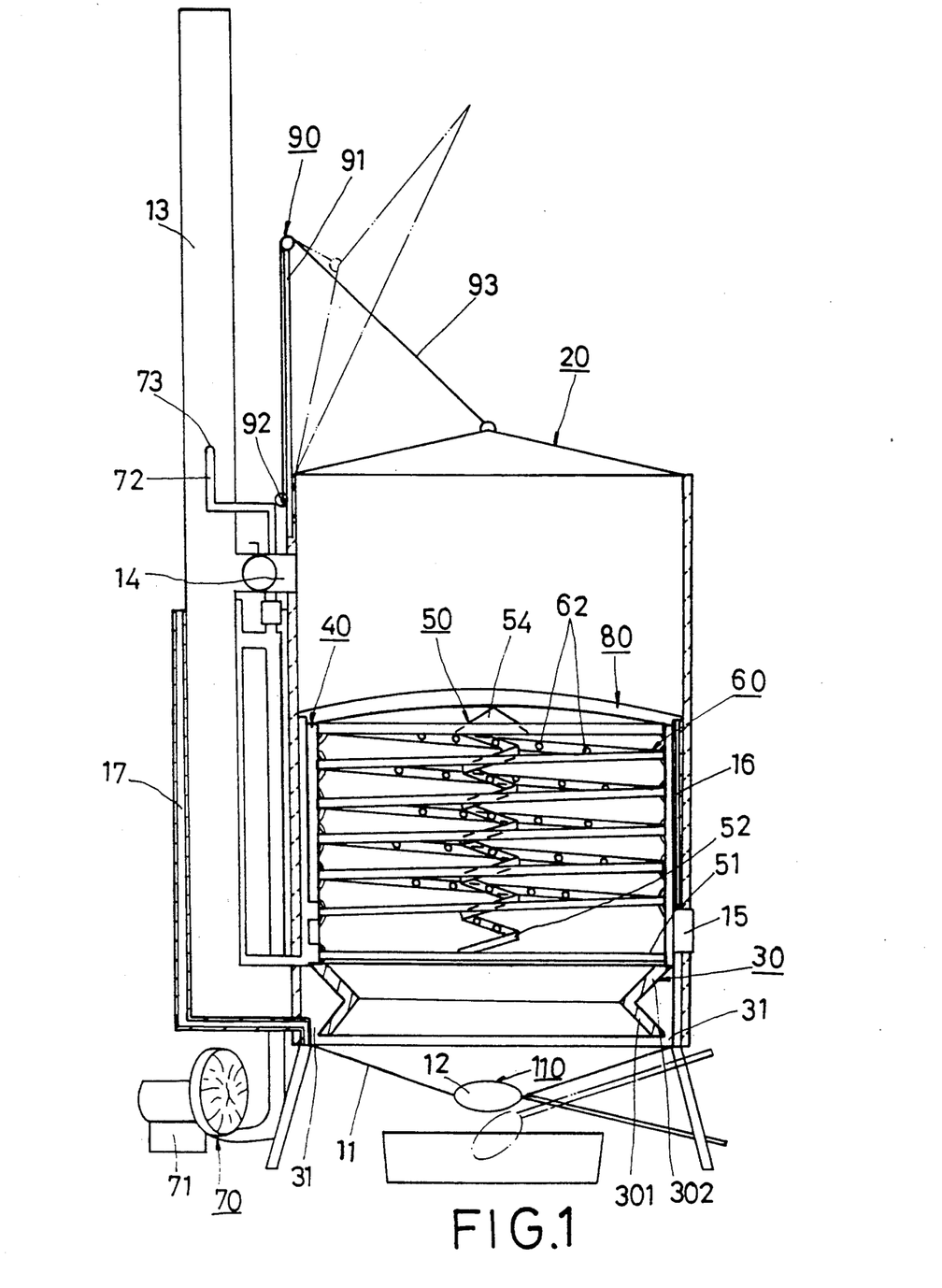
FIG. 1 is an illustration of the first preferred embodiment of an incinerator according to the present invention.
Figure 2:
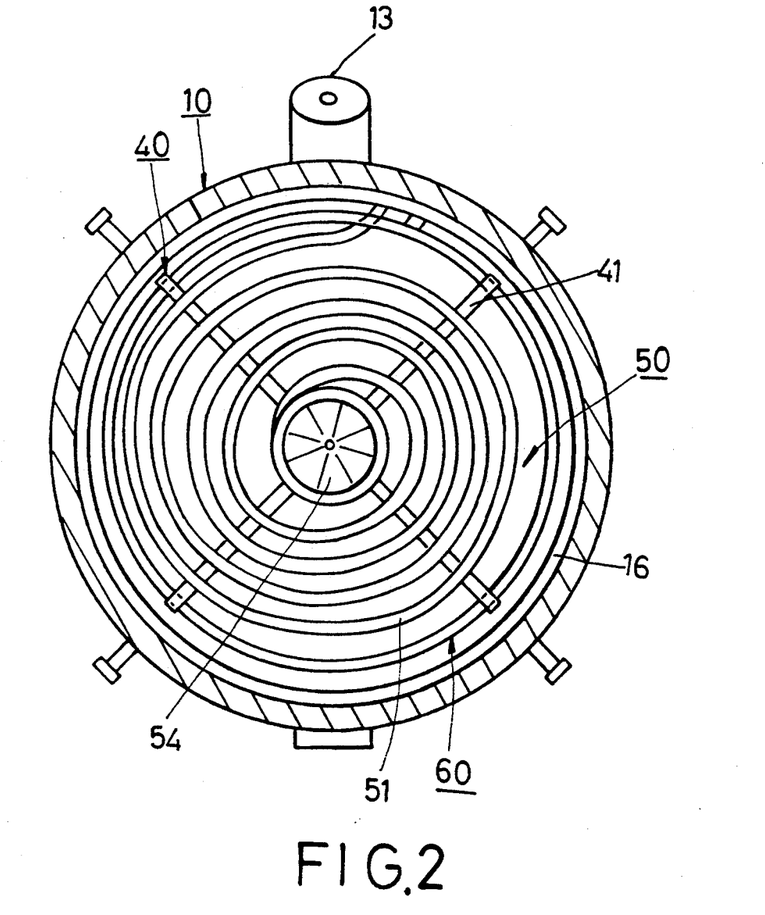
FIG. 2 is a top view of the first preferred embodiment.

Referring to FIGS. 1 and 2, the first preferred embodiment of an incinerator according to the present invention is shown to comprise a furnace body 10, a furnace cover 20, a hollow guide unit 30, a support bracket 40, a first preheating tube arrangement 60, a second preheating tube arrangement 50, a high pressure air generating unit 70 and an annular protector 80.

The furnace body 10 confines a combustion chamber for receiving and burning refuse therein. In this embodiment, the furnace body 10 is a circular cylinder, although square, rectangular, or oval cylinders may be used instead. Square and oval cylinders are ideal for large furnace bodies 10. The furnace body 10 has a bottom wall 11 which is formed as a tapered conical wall and which is provided with a central opening 110. An ash release gate 12 is mounted pivotally to the bottom wall 11 at the central opening 110. A stack 13 is provided on one side of the furnace body 10 and has a lower end part which is communicated with the combustion chamber of the furnace body 10 adjacent to the bottom wall 11 of the latter. The stack 13 is provided with an exhaust port 14 that is communicated with the combustion chamber of the furnace body 10 adjacent to an open top of the latter. The furnace body 10 is further provided with a small furnace gate 15 which is disposed at a level that is slightly higher than the lower end part of the stack 13 and which is opened when lighting a flame in the furnace body 10. A first air preheating conduit 16 is secured around the inner surrounding wall surface of the furnace body 10 at a lower part of the latter. A second air preheating conduit 17 is secured around the outer wall surface of the stack 13 at the lower end part of the latter and is communicated with the first air preheating conduit 17.

The furnace cover 20 is used to cover an open top of the furnace body 10. Opening and closing movement of the furnace cover 20 is controlled automatically by a cover control device 90. The cover control device 90 includes a rigid string support 91, an automatic string winding mechanism 92 and a metal string 93. The string support 91 extends upwardly from the open top of the furnace body 10. The automatic string winding mechanism 92 is secured on the string support 91. One end of the metal string 93 is wound on the automatic string winding mechanism 92, while the other end of the former is extended along the string support 91 and is connected to the furnace cover 20. Winding action of the automatic string winding mechanism 92 causes the furnace cover 20 to move to an open position. Accordingly, unwinding action of the automatic string winding mechanism 92 causes the furnace cover 20 to move to a closed position.

The hollow guide unit 30 includes two truncated conical wall portions 301, 302 that have diameter-reduced ends which are coupled to one another. The hollow guide unit 30 is disposed inside the furnace body 10 at the lower part of the latter adjacent to the lower end part of the stack 13. The hollow guide unit 30 has an upper end which is welded to the inner surrounding wall surface of the furnace body 10 and further has a lower end which is spot welded to the inner surrounding wall surface of the furnace body 10 and which forms a clearance 31 with the latter. The flue gases which are produced during combustion flow into the stack 13 via the clearance 31. The hollow guide unit 30 serves to guide the ashes which are produced during combustion toward the bottom wall 11 of the furnace body 10.

Figure 3:
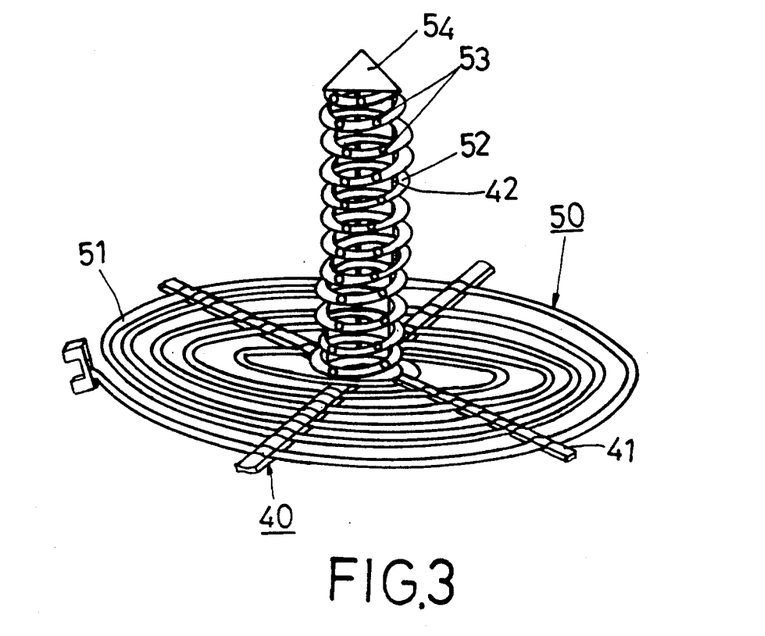
FIG. 3 is a perspective view of a second preheating tube arrangement of the first preferred embodiment.
Figure 4:
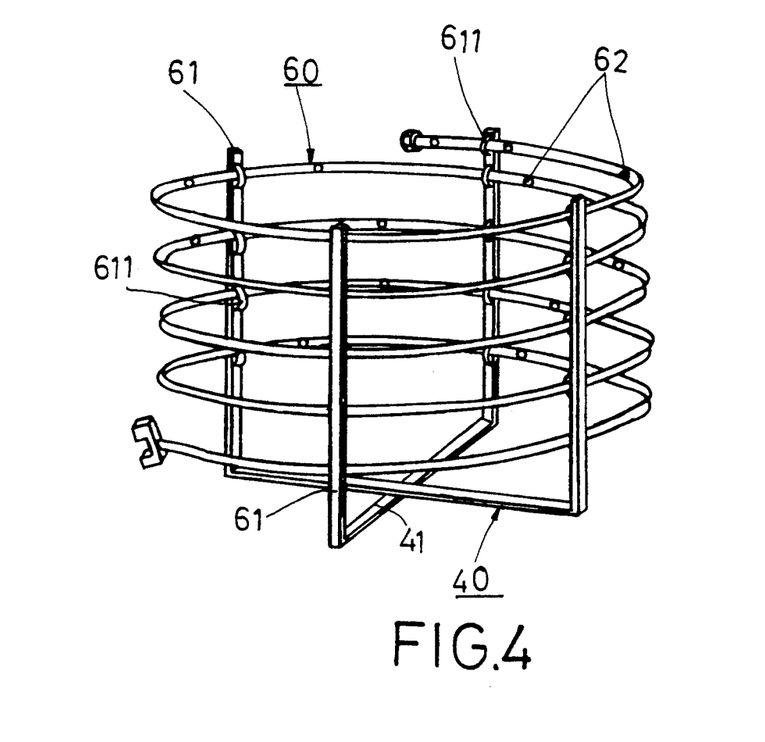
FIG. 4 is a perspective view of a first preheating tube arrangement of the first preferred embodiment.

The support bracket 40 is provided inside the furnace body 10 on top of the hollow guide unit 30. Referring to FIGS. 3 and 4, the support bracket 40 includes a horizontal support portion 41 and a vertical support portion 42. The horizontal support portion 41 is formed from two steel bars which are welded to form a cross-shaped structure. The vertical support portion 42 is mounted on the junction of the steel bars of the horizontal support portion 41.

The second preheating tube arrangement 50 is mounted on the support bracket 40. Referring to FIG. 3, the second preheating tube arrangement 50 includes a horizontal spiral portion 51 that is mounted on the horizontal support portion 41 of the support bracket 40, and a vertical coiled portion 52 that extends from one end of the horizontal spiral portion 51 and that is mounted on the vertical support portion 42. The surface of the vertical coiled portion 52 is formed with a plurality of air holes 53 which permit the flow of high temperature air therethrough. Referring once more to FIG. 1, the second preheating tube arrangement 50 has one end communicated with the first air preheating conduit 16. An inverted cone-shaped cover 54 is provided on a top end of the vertical coiled portion 52 to prevent refuse from being entrapped at the top end of the second preheating tube arrangement 50.

Referring to FIG. 4, the first preheating tube arrangement 60 is mounted on the horizontal support portion 41 and includes a plurality of concentric coil turns that coil upwardly from the horizontal spiral portion 51. A plurality of upright supports 61 extend from the horizontal support portion 41 of the support bracket 40 and are formed with support rings 611 for supporting the first preheating tube arrangement 60, thus securing the first preheating tube arrangement 60 to the inner surrounding wall surface of the furnace body 10. In this embodiment, there are four upright supports 61. The surface of an upper part of the first preheating tube arrangement 60 is formed with a plurality of air holes 62 which permit the flow of high temperature air therethrough. Referring once more to FIG. 1, the first preheating tube arrangement 60 has one end communicated with the first air preheating conduit 16.

The air generating unit 70 includes an air blower 71, an air conduit 72 and a nozzle 73 which is connected to one end of the air conduit 72 and which extends upwardly into the stack 13 at the upper end part of the latter. The air blower 71 is secured to the ground and generates high pressure air when operated. The air blower 71 and the air conduit 72 are connected in a conventional manner such that the high pressure air from the former flows through the latter. The air conduit 72 is communicated with the second air preheating conduit 17, thereby permitting a part of the high pressure air from the air blower 71 to flow through the first and second air preheating conduits 16, 17.

The annular protector 80 is mounted on top of the first preheating tube arrangement 60 and prevents refuse from being entrapped between the first preheating tube arrangement 60 and the furnace body 10.

Referring once more to FIG. 1, when the incinerator of the present invention is operated, it is necessary to preheat the furnace body 10. The preheating procedure is as follows: Initially, the ash release gate 12 is closed, while the furnace cover 20 is opened. Dry and easy-to-burn refuse is then provided in the furnace body 10. The height of refuse in the furnace body 10, however, should not exceed that of the first and second preheating tubes 60, 50. The furnace gate 15 and the exhaust port 14 are opened afterwards. The furnace cover 20 is closed, and a flame is lighted in the furnace body 10. The furnace gate 15 is then closed, and the air blower 71 is activated so as to send air through the nozzle 73 and the first and second air preheating conduits 16, 17. High pressure air flows out of the air holes 62, 53 of the first and second preheating tubes 60, 50 at this stage. The initial operation of the incinerator of the present invention is generally similar to that of a conventional incinerator. Flue gases that result from combustion of refuse in the incinerator flow out of the exhaust port 14. When the refuse in the furnace body 10 has been burnt completely at a high temperature, high temperature air flows out of the air holes 62, 53 in the first and second preheating tubes 60, 50. Since the temperature at this stage has already exceeded the combustion temperature, preheating of the incinerator has thus been completed.

After preheating of the incinerator has been accomplished, the exhaust port 14 is closed while the furnace cover 20 is again opened so as to provide refuse into the furnace body 10. The refuse burns immediately therein. Because the weight of unburned refuse is greater than that of burnt refuse, the unburned refuse moves downward toward the bottom of the furnace body 10 past the first and second preheating tubes 60, 50, thereby burning the same. It is thus necessary to replenish regularly the furnace body 10 with a new batch of refuse that is to be disposed adjacent to the first and second preheating tubes 60, 50. When burning of the refuse has been completed, the temperature within the furnace body 10 drops until a temperature switch in the stack 13 is cut-off automatically to indicate that the refuse incinerating procedure has been completed. Aside from lighting a flame in the furnace body 10, the furnace gate 15 also facilitates removal of non-combustible refuse in the furnace body 10.

Note that in the incinerator of the present invention, refuse is burned from the bottom pile to the top pile. The ashes produced from burning of the refuse is collected at the bottom wall 11 of the furnace body 10. The weight of the unburned refuse in the furnace body 10 causes the unburned refuse to move toward the first and second preheating tubes 60, 50 so as to effectively burn the same.

Referring once more to FIG. 1, high pressure air from the air blower 71 flows through the air preheating conduits 17, 16. Air in the first air preheating conduit 16 completes one revolution within the furnace body 10 before entering the first and second preheating tubes 60, 50. It has been mentioned earlier that an incinerator preheating procedure must be performed before the incinerator of the present invention can be used effectively. Thus, the air inside the first air preheating conduit 16 can be heated to a temperature above the combustion temperature during the preheating procedure. Therefore, the air flowing out of the air holes 62, 53 of the first and second preheating tubes 60, 50 is sufficient to burn refuse in the furnace body 10. Simultaneous with the provision of air into the furnace body 10, the air blower 71 further provides high pressure air to the nozzle 73, thereby creating a high pressure region in the upper end part of the stack 13 and a low pressure region in the lower end part of the same. The flue gases in the furnace body 10 are thus drawn into the stack 13. As the flue gases flow downward to enter the stack 13, the flue gases pass through the hollow guide unit 30 and through the clearance 31 that is formed between the inner surrounding wall surface of the furnace body 10 and the hollow guide unit 30.

The characterizing features of the incinerator of the present invention are as follows:

1. As the flue gases flow downward, ashes move downward therewith. The hollow guide unit 30 provided at the lower part of the furnace body 10 serves to guide ashes and non-combustible refuse to the bottom wall 11 of the furnace body 10. Thus, the hollow guide unit 30 can serve to filter the flue gases as the latter pass through the clearance 31, thereby reducing the risk of air pollution.

2. The high pressure air provided by the air blower 71 serves to drive flue gases out of the stack 13 and further serves to provide fresh air to the furnace body 10, thereby permitting a continuous burning operation while reducing the amount of combustible material required to achieve an effective burning operation.

3. In the incinerator of the present invention, water in the refuse flows downward with the flue gases and does not affect burning of the refuse. The water can serve as a source of fresh air to aid in the burning of refuse. The incinerator of the present invention thus obviates the need for secondary and even tertiary refuse treatment, thereby reducing the time and the manpower required to effect garbage disposal.

4. The incinerator of the present invention can be operated continuously. As long as the level of unburned refuse in the furnace body 10 is above that of the first and second preheating tubes 60, 50, the furnace cover 20 can be left open so as to facilitate the pouring of refuse into the furnace body 10.

Figure 5:
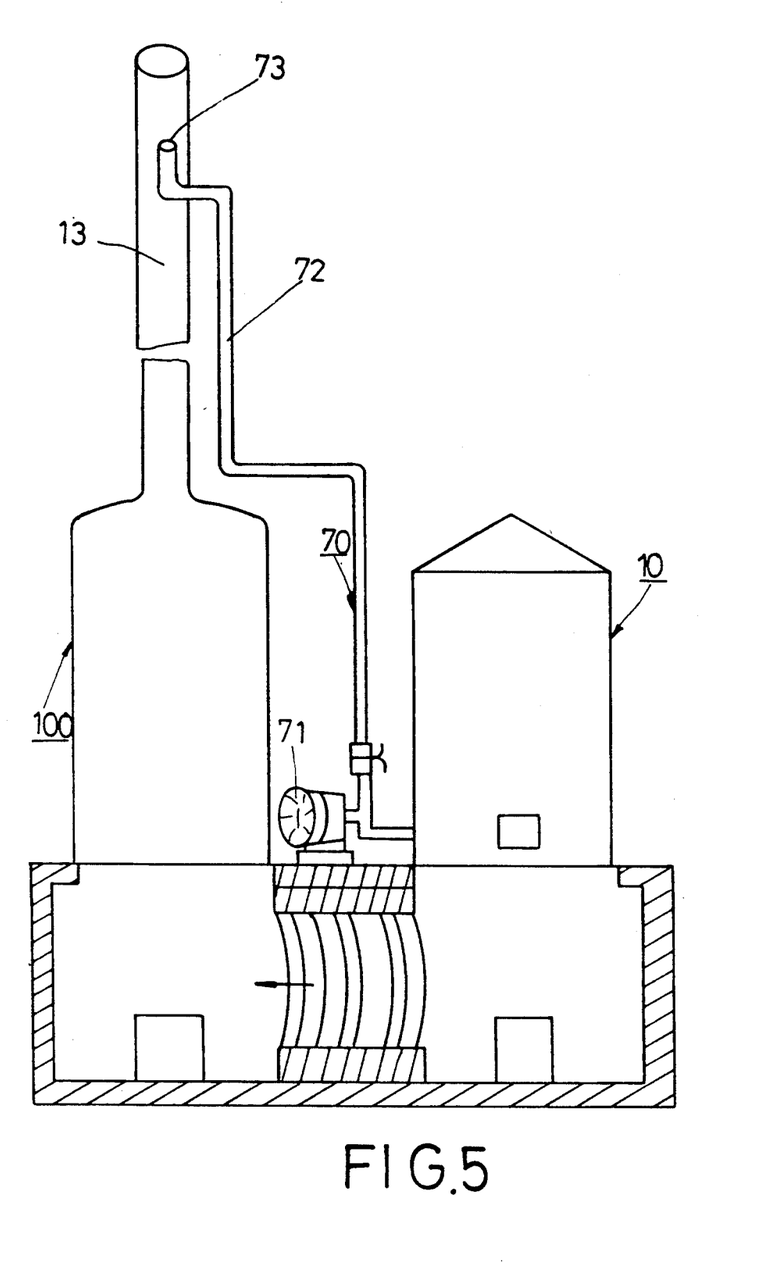
FIG. 5 is an illustration of the first preferred embodiment when used in combination with a steam boiler.

Referring to FIG. 5, the heat generated by the incinerator of the present invention can be used to operate a steam boiler 100. The steam generated by the steam boiler 100 serve as a source of power to operate a driven member.

Figure 6:
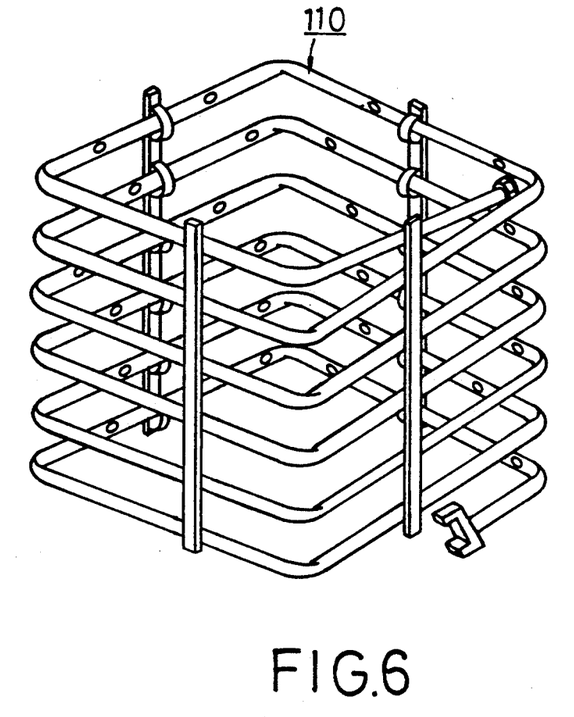
FIG. 6 is a perspective view of the first preheating tube arrangement of the second preferred embodiment of an incinerator according to the present invention.

FIG. 6 is a perspective view of another embodiment of a first preheating tube arrangement 110 according to the present invention. The first preheating tube arrangement 110 similarly coils upwardly but is formed with square turns. The first preheating tube arrangement 110 is suitable for use with a furnace body that is formed as a rectangular container.

Figure 7:
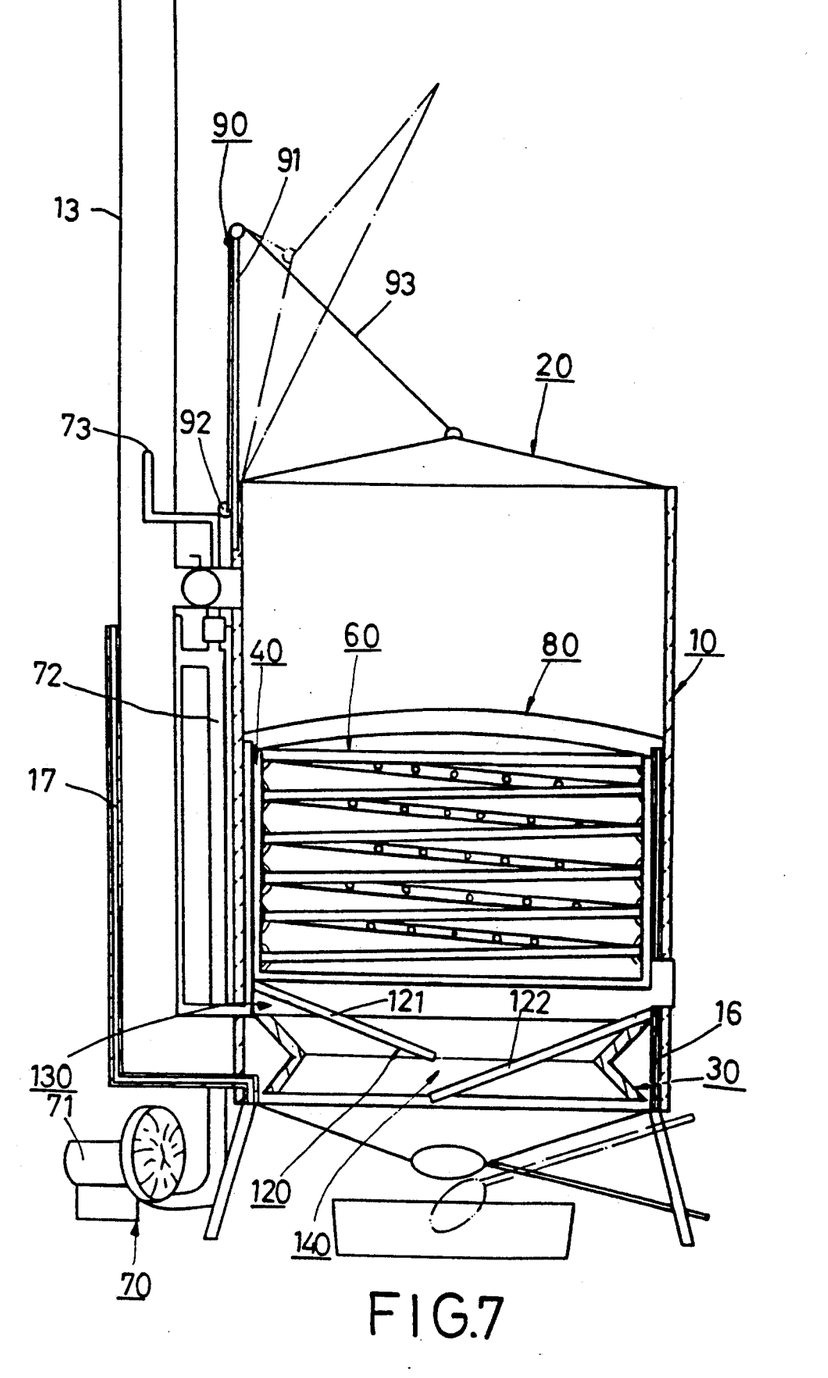
FIG. 7 is an illustration of the second preferred embodiment.
Figure 8:
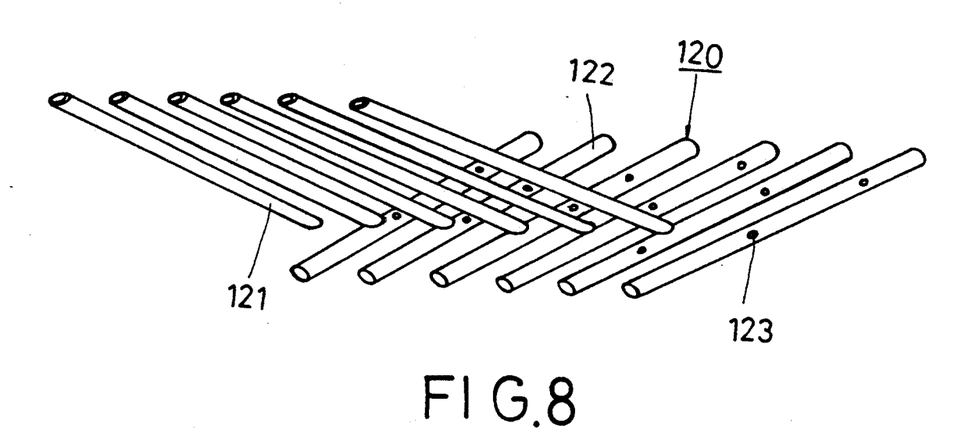
FIG. 8 is a perspective view of a y-shaped hearth which serves as the second preheating tube arrangement of the second preferred embodiment.

FIGS. 7 and 8 illustrate the second preferred embodiment of an incinerator according to the present invention. The main difference between the first and second preferred embodiments is as follows: A y-shaped hearth 120 is provided inside the lower part of the furnace body 10 and serves as the second preheating tube arrangement for this embodiment. The hearth 120 is disposed below the first preheating tube arrangement 60 and includes first and second rows of inclined metal tubes 121, 122. Each of the metal tubes has a distal closed end and a threaded open end that is connected to and communicated with the first air preheating conduit 16. The inner surrounding wall surface of the furnace body 10 is formed with a triangular support projection 130 which supports the top ends of the metal tubes 121. The top ends of the metal tubes 122 are supported by the top end of the hollow guide unit 30. When the hearth 120 is mounted inside the furnace body 10, the closed ends of the metal tubes 121 define a clearance 140 with an intermediate portion of the metal tubes 122. Referring to FIG. 8, the metal tubes 121, 122 are formed with a plurality of air holes 123 to permit the release of air thereat.

Note that when noncombustible refuse is incinerated in the incinerator of the present invention, the burnt noncombustible refuse is transformed into a solid piece instead of ashes. The purpose of the hearth 120 is to permit the solid pieces to slide to the bottom wall 11 of the furnace body 10 via the clearance 140 so as to prevent blockage from occurring.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

We claim:

1. An incinerator, comprising:
    a furnace body which confines a combustion chamber for receiving refuse therein, said furnace body having an open top, an inner surrounding wall surface, a lower part, an upper part, a bottom wall formed with a central opening, an ash release gate mounted pivotally to said bottom wall at said central opening, a stack which is provided on one side of said furnace body and which has an upper end part and a lower end part that is communicated with said combustion chamber adjacent to said bottom wall, and an exhaust port provided on said furnace body adjacent to said open top and operable so as to communicate said stack and said combustion chamber of said furnace body;

a furnace cover provided on said open top of said furnace body;

a first preheating tube arrangement secured to said inner surrounding wall surface of said furnace body at said lower part of said furnace body, said first preheating tube arrangement including a plurality of upwardly extending concentric coil turns and having a surface formed with a plurality of air holes;

a second preheating tube arrangement secured to said lower part of said furnace body, said second preheating tube arrangement having at least a portion provided adjacent to a lower part of said first preheating tube arrangement and further having a surface formed with a plurality of air holes; and a high pressure air generating unit for supplying high pressure air to said first and second preheating tube arrangements and to said upper end part of said stack.

2. The incinerator as claimed in claim 1, wherein said bottom wall of said furnace body is formed as a tapered conical wall.

3. The incinerator as claimed in claim 1, further comprising a cover control device for controlling automatic opening and closing movement of said furnace cover.

4. The incinerator as claimed in claim 3, wherein said cover control device comprises:

a rigid string support which extends upwardly from said open top of said furnace body;

an automatic string winding mechanism secured on said string support; and a metal string having one end wound on said automatic string winding mechanism and another end extended along said string support and connected to said furnace cover;

whereby, winding action of said automatic string winding mechanism causing said furnace cover to move to an open position, unwinding action of said automatic string winding mechanism causing said furnace cover to move to a closed position.

5. The incinerator as claimed in claim 1, further comprising a hollow guide unit which includes two truncated conical wall portions that have diameter-reduced ends which are coupled to one another, said hollow guide unit being disposed inside said lower part of said furnace body below said first preheating tube arrangement, said hollow guide unit having an upper end which is welded to said inner surrounding wall surface of said furnace body and further having a lower end which is spot welded to said inner surrounding wall surface of said furnace body and which forms a clearance therewith to permit passage of flue gases that are produced during combustion into said stack.

6. The incinerator as claimed in claim 5, further comprising:

a support bracket provided inside said furnace body on top of said hollow guide unit, said support bracket including a cross-shaped horizontal support portion and a vertical support portion extending upwardly from a central section of said horizontal support portion; and said second preheating tube arrangement including a horizontal portion that is mounted on said horizontal support portion of said support bracket and that is connected to said air generating unit at one end so as to receive high pressure air therefrom, and a vertical portion that extends from another end of said horizontal portion and that is mounted on said vertical support portion of said support bracket, said air holes of said second preheating tube arrangement being formed in said vertical portion.

7. The incinerator as claimed in claim 6, wherein said first preheating tube arrangement has a lowermost coil turn mounted on said horizontal support portion of said support bracket, said support bracket further having a plurality of upright supports that extend from said horizontal support portion and that are formed with support rings for supporting said coil turns of said first preheating tube arrangement.

8. The incinerator as claimed in claim 6, wherein said horizontal portion of said second preheating tube arrangement is spiral.

9. The incinerator as claimed in claim 6, wherein said vertical portion of said second preheating tube arrangement is coiled.

10. The incinerator as claimed in claim 1, wherein said coil turns of said first preheating tube arrangement are circular turns.

11. The incinerator as claimed in claim 1, wherein said coil turns of said first preheating tube arrangement are square turns.

12. The incinerator as claimed in claim 1, wherein said air pressure generating unit comprises:

an air blower for generating said high pressure air;

an air conduit connected to said air blower to permit said high pressure air to flow therethrough, said air conduit being communicated with said first and second preheating tube arrangements to permit a part of said high pressure air to flow into said furnace body; and a nozzle which is connected to one end of said air conduit and which extends upwardly into said stack at said upper end part of said stack.

13. The incinerator as claimed in claim 1, further comprising an annular protector mounted on top of said first preheating tube arrangement to prevent refuse from being trapped between said first preheating tube arrangement and said inner surrounding wall surface of said furnace body.

14. The incinerator as claimed in claim 12, further comprising a first air preheating conduit secured around said inner surrounding wall surface of said furnace body at said lower part of said furnace body, and a second air preheating conduit secured around an outer wall surface of said lower end part of said stack and communicated with said first air preheating conduit, said second air preheating conduit being connected to and being communicated with said air conduit of said air generating unit, said first and second preheating tube arrangements being connected to and communicated with said first air preheating conduit.

15. The incinerator as claimed in claim 6, further comprising an inverted cone-shaped cover provided on a top end of said vertical portion of said second preheating tube arrangement to prevent refuse from being trapped at said top end of said second preheating tube arrangement.

16. The incinerator as claimed in claim 1, wherein said second preheating tube arrangement comprises a y-shaped hearth disposed beneath said first preheating tube arrangement, said hearth including opposite first and second rows of inclined metal tubes which have distal closed ends and opposite open ends connected to said inner surrounding wall surface of said furnace body and communicated with said air generating unit, said metal tubes being formed with a plurality of air holes.

17. The incinerator as claimed in claim 16, wherein said closed ends of said first row of inclined metal tubes define a clearance with an intermediate portion of said second row of inclined metal tubes.

* * * * *